J. R. SNYDER.
DOUBLE HEADING CONTROL VALVE.
APPLICATION FILED MAR. 30, 1912.

1,086,335.

Patented Feb. 3, 1914.

WITNESSES

INVENTOR
Jacob Bush Snyder.
By Fredk W Winter
Attorney

UNITED STATES PATENT OFFICE.

JACOB RUSH SNYDER, OF PITTSBURGH, PENNSYLVANIA, ASSIGNOR, BY MESNE ASSIGNMENTS, TO PITTSBURGH AIR BRAKE COMPANY, A CORPORATION OF PENNSYLVANIA.

DOUBLE-HEADING CONTROL-VALVE.

1,086,335.  Specification of Letters Patent.  Patented Feb. 3, 1914.

Application filed March 30, 1912. Serial No. 687,535.

*To all whom it may concern:*

Be it known that I, JACOB RUSH SNYDER, a resident of Pittsburgh, in the county of Allegheny and State of Pennsylvania, have invented a new and useful Improvement in Double-Heading Control-Valves, of which the following is a specification.

This invention relates to a double heading control valve for air brake systems.

The object of the invention is to provide a valve on an engine so connected to the air brake system that when the engine is running second or third in a multiple header with the engineer's brake valve set in running position, it controls the connection between the main reservoir and the train pipe on that engine so as to prevent the main reservoir pressure from kicking off the brakes when set in either service or emergency application by the engineer on the leading engine, thus giving the engineer on the leading engine the same control of the main reservoir pressure on any subsequent engine that he has over his own engine.

The invention comprises a valve constructed and arranged as hereinafter described and claimed.

Figure 2:
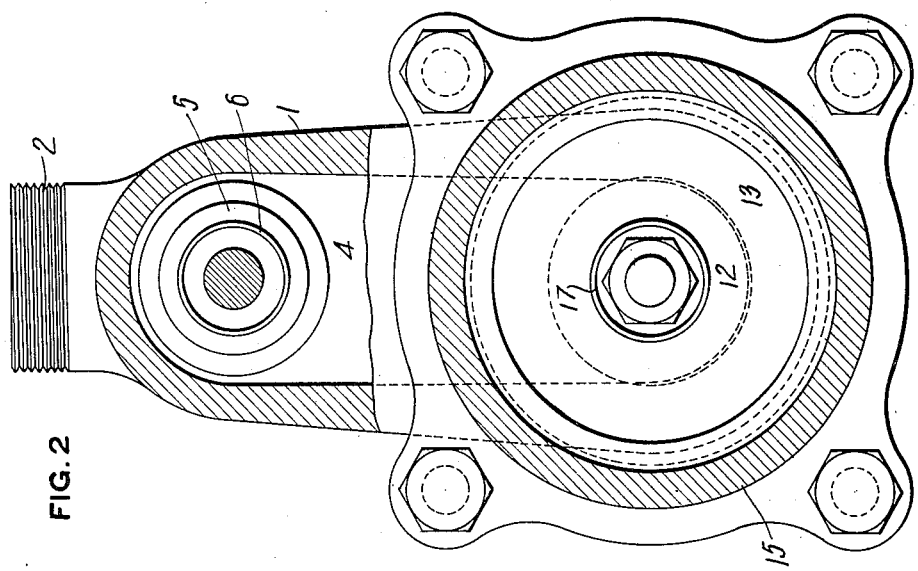
Figure 1:
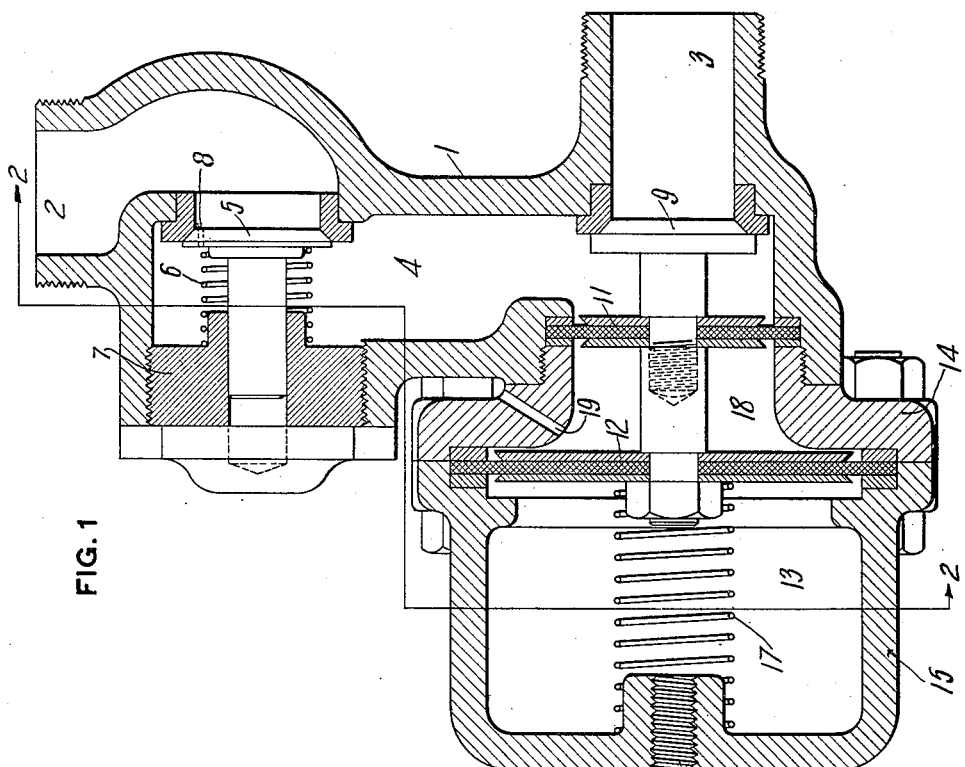

In the accompanying drawing, Figure 1 is a longitudinal section through the valve; and Fig. 2 is a transverse section thereof on the line 2—2, Fig. 1.

The valve comprises a suitable casing formed of as many parts as necessary for its convenient manufacture and assembling and containing therein the necessary valve and piston or diaphragm for actuating the same. As illustrated, the valve casing comprises a main body portion 1 having near its upper end the main reservoir connection 2 and near its lower end the train pipe connection 3. The passage 4 between said connections is controlled by equalizing check valve 5 normally held seated against main reservoir pressure by spring 6, said check valve being guided in the removable cap 7 through which the check valve is accessible, and being provided with equalizing port 8.

The connection between the main reservoir and the train pipe is further controlled by the cut-off valve 9 seating toward the train pipe. This cut-off valve is actuated by a differential piston mechanism, which may be either a piston or a pair of diaphragms, as illustrated, to wit, a small diaphragm 11 subject at all times to train pipe or main reservoir pressure in passage 4, and a large diaphragm 12 subject to pressure in chamber 13 coming from some suitable source, such as the auxiliary reservoir, by way of port 16 from the triple valve. The diaphragm 11 is clamped between a shoulder on the main body portion 1 and the casing member 14, while the diaphragm 12 is clamped between said casing member 14 and the casing member 15 which forms the inclosure for chamber 13, and which is provided with a connection 16 to a triple valve port which is so arranged that in service application position of the triple valve auxiliary reservoir pressure is admitted to chamber 13 against the outer face of diaphragm 12. A spring 17 is arranged to act on diaphragm 12 in the same direction as auxiliary reservoir pressure, that is, to close cut-off valve 9. The space 18 between diaphragms 11 and 12 is open to the atmosphere through port 19, so that pressure cannot exist between the diaphragms. The cut-off valve 9 seats toward the train pipe so that it is assisted in its closing movement and is held to its seat by main reservoir pressure behind it.

When the engineer's brake valve on the leading engine is in running position and the engineer's valve on the subsequent engine is in running position and with the triple valves in corresponding position, no pressure exists in chamber 13. Consequently, main reservoir pressure acting against the smaller area of the differential piston mechanism pushes the same outwardly and unseats valve 9, so that main reservoir pressure unseats equalizing check valve 5 and flows to the train pipe in the usual way. As soon as the triple valve mechanism moves to service application position, such as when the leading engineer's brake valve is set to service application position, the triple valve admits auxiliary reservoir pressure into chamber 13 and this pressure, supplemented by spring 17, acting on the large area of the differential piston mechanism, overbalances main reservoir and train pipe pressure acting against the small area of said differential piston mechanism. The consequence is that the valve 9 is seated, thereby preventing the flow of air from the main reservoir to the train pipe as would otherwise occur on the second and subsequent engines of a multiple header, whenever train pipe pressure is reduced at the leading engine for service or emergency application. As soon as the train pipe pressure is restored at the leading engine, the triple valves on the subsequent engines, as well as throughout the train, go to release position, which exhausts the pressure from chamber 13 and permits main reservoir pressure in passage 4 acting against diaphragm 11 to unseat valve 9 and permit main reservoir pressure to flow to the train pipe to supplement the main reservoir pressure coming from the leading engine.

Equalizing check valve 5 is normally seated by spring 6 toward main reservoir pressure, spring 6 being of sufficient strength to hold equalizing check valve 5 temporarily against its seat during any normal service application train pipe reduction. This permits the triple valve mechanism to be actuated in the usual manner, and allows auxiliary reservoir pressure to flow into chamber 13 and close valve 9, which in turn prevents main reservoir pressure from any subsequent engine reaching the train pipe during the initial reduction of the pressure therein by the engineer of the leading engine, and therefore prevents main reservoir pressure from any assisting engine defeating the intended service or emergency application by the engineer of the leading engine, or otherwise. In other words, it gives the engineer on the leading engine absolute control of the train, including the assisting engines, and gives him the same control of the main reservoir pressure on the assisting engines that he has over that of his own engine.

The valve is entirely automatic and consequently requires no attention whatsoever on the part of the engineer on the second and subsequent engine, but leaves the brakes of the entire train under the control of the engineer of the leading engine.

The valve illustrated and described is also shown and described but not claimed in my application Serial No. 689,753, filed April 10, 1912, which application illustrates a system embodying the said valve and shows the connection of the said valve to the main reservoir, the train pipe and an auxiliary reservoir through a triple valve.

What I claim is;

1. A double heading control valve for air brake systems, comprising a casing having connections to the main reservoir, to the train pipe and to a source of pressure controlled by a triple valve, a valve arranged to close communication between the main reservoir and train pipe connections, differential piston mechanism for actuating said valve and being open on its smaller area to train pipe pressure and on its larger area to pressure controlled by the triple valve, and a check valve between said cut-off valve and the main reservoir connection and seating toward the main reservoir.

2. A double heading control valve for air brake systems, comprising a casing having connections to the main reservoir, to the train pipe and to a triple valve, a valve arranged to close communication between the main reservoir and train pipe connection and seating toward the train pipe, a check valve between said last named valve and the main reservoir connection and seating toward the main reservoir, and differential piston mechanism for actuating the first named valve and so arranged that it is subjected on its smaller area to train pipe pressure and on its larger area to pressure admitted thereto by the triple valve when in application position.

3. A double heading control valve for air brake systems, comprising a casing having connections to the main reservoir, to the train pipe and to a source of pressure controlled by a triple valve, a valve arranged to close communication between the main reservoir and the train pipe connections, differential piston mechanism for actuating said valve and being open on its smaller area to train pipe pressure and on its larger area to pressure controlled by the triple valve, and pressure reducing means in the main reservoir connection.

4. A double heading control valve for air brake systems, comprising a casing having connections to the main reservoir, to the train pipe and to a source of pressure controlled by a triple valve, a check valve type of valve arranged to close communication between the main reservoir and the train pipe connections and seating toward the train pipe, and differential piston mechanism for actuating said valve and being open on its smaller area to train pipe pressure and on its larger area to pressure controlled by the triple valve.

In testimony whereof, I have hereunto set my hand.

JACOB RUSH SNYDER.

Witnesses:
F. W. WINTER,
WILLIAM B. WHARTON.